(12) United States Patent
Ohara

(10) Patent No.: US 9,873,234 B2
(45) Date of Patent: Jan. 23, 2018

(54) TIRE CURING MOLD AND MANUFACTURING METHOD FOR TIRE

(71) Applicant: TOYO TIRE & RUBBER CO., LTD., Osaka-shi, Osaka (JP)

(72) Inventor: Masaaki Ohara, Osaka (JP)

(73) Assignee: TOYO TIRE & RUBBER CO., LTD., Osaka-shi (JP)

( * ) Notice: Subject to any disclaimer, the term of this patent is extended or adjusted under 35 U.S.C. 154(b) by 0 days.

(21) Appl. No.: 15/351,713

(22) Filed: Nov. 15, 2016

(65) Prior Publication Data

US 2017/0157871 A1    Jun. 8, 2017

(30) Foreign Application Priority Data

Dec. 3, 2015  (JP) ................. 2015-237014

(51) Int. Cl.
*B29D 30/06* (2006.01)
*B29C 33/10* (2006.01)

(52) U.S. Cl.
CPC .......... *B29D 30/0606* (2013.01); *B29C 33/10* (2013.01); *B29D 2030/0617* (2013.01); *B29K 2905/02* (2013.01)

(58) Field of Classification Search
CPC ........ B29D 30/0606; B29D 2030/0617; B29C 33/10
See application file for complete search history.

(56) References Cited

U.S. PATENT DOCUMENTS

| | | | | |
|---|---|---|---|---|
| 4,351,789 A | * | 9/1982 | Sidles | B29C 33/10 249/141 |
| 4,492,554 A | * | 1/1985 | Carter | B29C 33/10 425/28.1 |
| 6,923,629 B2 | * | 8/2005 | Ahn | B29C 33/10 425/28.1 |
| 7,654,817 B2 | * | 2/2010 | Yagi | B29C 33/10 249/141 |
| 9,604,421 B2 | * | 3/2017 | Cazzanti | B29D 30/0606 |
| 2008/0047642 A1 | * | 2/2008 | Ohara | B29D 30/0606 152/209.15 |

(Continued)

FOREIGN PATENT DOCUMENTS

| | | |
|---|---|---|
| GB | 922788 A | 4/1963 |
| JP | 2015-9544 A | 1/2015 |
| JP | 2015-24501 A | 2/2015 |

(Continued)

*Primary Examiner* — James Mackey
(74) *Attorney, Agent, or Firm* — Westerman, Hattori, Daniels & Adrian, LLP

(57) ABSTRACT

A tire curing mold has a vent plug installed to an exhaust hole open to a molding surface. The vent plug has a tubular housing having an exhaust passage, a stem inserted to the housing, and an urging member which urges the steal toward the cavity so as to open the exhaust passage. The stem has a head portion which closes the exhaust passage by contacting with an inner surface of an opening portion in the housing. A top surface of the opening portion in the housing and a top surface of the head portion are formed by a flat surface. The top surface of the opening portion in the housing and the top surface of the head portion in a state in which the exhaust passage is closed are both arranged closer to an opposite side to the cavity than the molding surface.

15 Claims, 5 Drawing Sheets

(56) References Cited

U.S. PATENT DOCUMENTS

2012/0256349 A1* 10/2012 Ohara ............... B29D 30/0606
264/326
2017/0106614 A1* 4/2017 Hiraki ................. B60C 11/00

FOREIGN PATENT DOCUMENTS

| JP | 2015-51611 A | 3/2015 |
| WO | 2006/070411 A1 | 7/2006 |

* cited by examiner

TIRE CURING MOLD AND MANUFACTURING METHOD FOR TIRE

BACKGROUND OF THE INVENTIONS

Field of the Invention

The present invention relates to a tire curing mold in which vent plugs are installed to exhaust holes on a molding surface coming into contact with an outer surface of a tire, and a manufacturing method for the tire using the same.

Description of the Related Art

In the tire curing mold, a lot of exhaust holes are provided on a molding surface which comes into contact with the outer surface of the tire, thereby discharging excess air between the tire and the molding surface to an external portion. As disclosed in patent document 1, there is a case that the vent plug is installed to the exhaust hole, whereby formation of a rubber projection called as spew can be reduced. Furthermore, as disclosed in patent documents 2 to 5, there has been known a vent plug (a spring vent) which is opened when a stem inserted to a tubular housing is urged by a spring and is closed when the stem is depressed by an outer surface of the tire.

In the spring vent, an uncured rubber flowing from a side direction flows into an inner portion from a gap between the housing and the stem before the stem is depressed. As a result, there has been a problem so-called rubber biting that the inflow rubber within the housing entwines the spring. In the case that the rubber biting is generated, the inflow rubber is not removed when the tire which is finished its cure is removed from the mold, and the inflow rubber remaining in the housing prevents movement of the spring. As a result, an operation defect of the vent plug is caused. Thus, there has been strongly desired to propose a method which can suppress generation of the rubber-biting.

In the patent document 2, there is described a vent plug (a spring vent) in which a top surface of a steal is formed by a protruding surface, and a top surface of the stem in a closed state is arranged at a position which sinks a little from a molding surface. However, since a projection having a top surface which is formed by a recessed surface corresponding to the protruding surface is formed on an outer surface of the tire in the vent plug, the projection having the above shape is distinctive and thus there is a risk that the projection gives an outer appearance of the tire a feeling of strangeness.

PRIOR ART DOCUMENT

Patent Document

Patent Document 1: GB 922788 B
Patent Document 2: WO 2006/070411 A
Patent Document 3: JP-A-2015-009544
Patent Document 4: JP-A-2015-024501
Patent Document 5: JP-A-2015-051611

SUMMARY OF THE INVENTION

The present invention is made by taking the actual condition mentioned above into consideration, and an object of the present invention is to provide a tire curing mold which can secure a quality of an outer appearance of a tire by suppressing generation of a rubber biting, and a manufacturing method of a tire using the same.

The object can be achieved by the following present invention. The present invention provides a tire curing mold comprising: a molding surface which comes into contact with an outer surface of a tire set to a cavity; a vent plug which is installed to an exhaust hole open to the molding surface, wherein the vent plug is provided with a tubular housing which has an exhaust passage in an inner portion, a stem which is inserted to the housing and forms a valve body opening and closing the exhaust passage, and an urging member which urges the stem toward the cavity so as to open the exhaust passage, wherein the stem has a columnar body portion which extends in an axial direction of the housing, and a head portion which closes the exhaust passage by coming into contact with an inner surface of the opening portion in the housing, wherein each of a top surface of the opening portion in the housing and a top surface of the head portion in the stem is formed by a flat surface, and wherein the top surface of the opening portion in the housing and the top surface of the head portion in the stem in a state in which the exhaust passage is closed are both arranged closer to an opposite side to the cavity than the molding surface.

In the mold, the top surface in the opening portion of the housing and the top surface in the head portion of the stem in the closed state are both arranged closer to the opposite cavity side than the molding surface. Therefore, the uncured rubber flowing from the side direction tends to come into contact with the head portion of the steal from the above (the cavity side) not from the side direction. As a result, it is possible to suppress the generation of the rubber biting by reducing the inflow rubber. In addition, since each of the top surface in the opening portion of the housing and the top surface in the head portion of the stem is formed by the flat surface, the projection formed on the outer surface of the tire is an indistinctive shape, and contributes to securement of the quality of the outer appearance of the tire.

It is preferable that the top surface of the head portion in the stem in the state in which the exhaust passage is closed is arranged flush with the top surface of the opening portion in the housing. According to the structure mentioned above, since any step or streak is not formed on the top surface of the projection which is formed on the outer surface of the tire, it is possible to better secure the quality of the outer appearance of the tire.

It is preferable that the top surface of the head portion in the stem in a state in which the exhaust passage is opened is arranged flush with the molding surface, or is arranged closer to an opposite side to the cavity than the molding surface. According to the structure mentioned above, since the uncured rubber flowing from the side direction more securely comes into contact with the head portion of the stem from the above (the cavity side), it is possible to effectively suppress the generation of the rubber biting.

It is preferable that an edge portion connecting an inner peripheral surface of the exhaust hole and the molding surface is formed by a curved surface or an inclined surface. According to the structure mentioned above, it is possible to prevent generation of a crack starting from a root of the projection formed on the outer surface of the tire, thereby preventing the quality of the outer appearance of the tire from being deteriorated.

It is preferable that the top surface of the opening portion in the housing coincides with a boundary between the inner peripheral surface of the exhaust hole and the curved surface or the inclined surface, or is arranged closer to an opposite side to the cavity than the boundary. Thus, since the side surface of the projection formed on the outer surface of the tire becomes smooth and is formed into an indistinctive shape, it is useful for securing the quality of the outer appearance of the tire.

The present invention provides a manufacturing method of a tire comprising a step of setting an uncured tire to the cavity of the above tire curing mold and curing while heating and pressurizing the uncured tire. According to the method mentioned above, it is possible to obtain a good tire outer appearance while preventing the operation defect of the vent plug by suppressing the generation of the rubber biting as mentioned above.

DETAILED DESCRIPTION OF THE PREFERRED EMBODIMENTS

Figure 1:
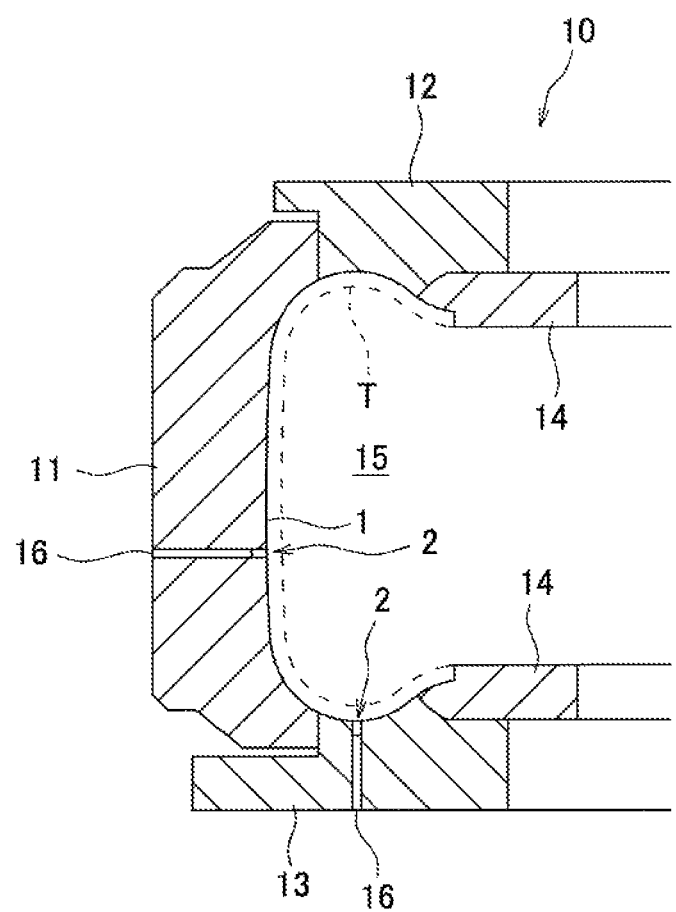
FIG. 1 is a vertical cross sectional view schematically showing an example of a tire caring mold according to the present invention.
Figure 2:
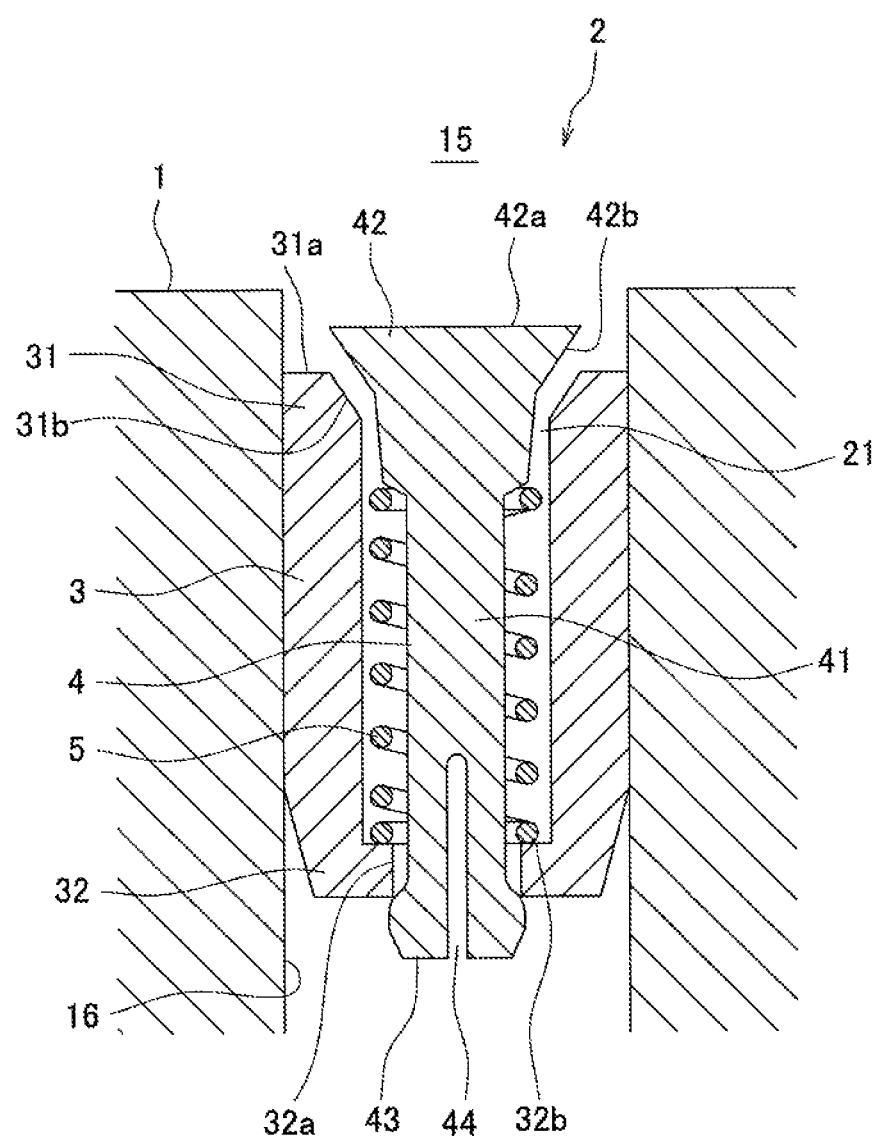
FIG. 2 is a cross sectional view showing a substantial part of the tire curing mold in a state in which a vent plug is open.
Figure 3:
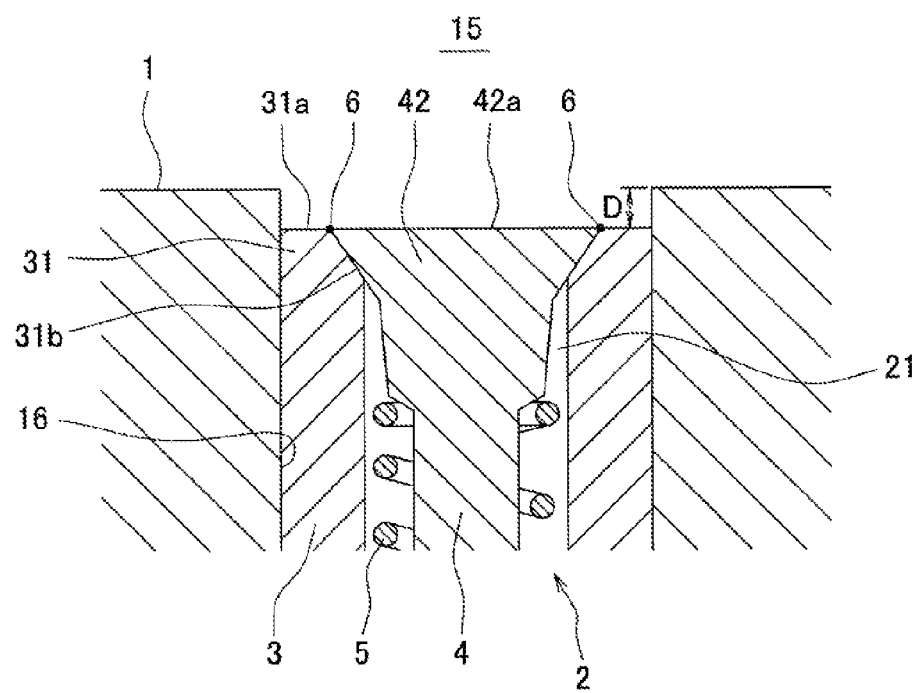
FIG. 3 is a cross sectional view showing a substantial part of the tire curing mold in a state in which the vent plug is closed.

An embodiment of the present invention will be explained with reference to the drawings. FIG. 1 shows a cross section of a tire curing mold 10 along a tire meridian cross section, and FIGS. 2 and 3 show a substantial part thereof in an enlarged manner.

As shown in FIG. 1, the tire curing mold 19 is provided with a molding surface 1 which comes into contact with an outer surface of a tire T set in a cavity 15. A lot of exhaust holes 16 communicating an inner portion (the cavity 15) of the metal mold 10 with an external portion are provided in the molding surface 1 in order to discharge excess air between the tire and the molding surface 1 at the curing time. As shown in FIG. 2 in an enlarged manner, a vent plug 2 is installed to the exhaust hole 16 which is open to the molding surface 1. The vent plug 2 is constructed as a so-called spring vent.

An aluminum material is exemplified as a raw material of the molding surface 1. The aluminum material is a concept including an aluminum alloy in addition to a pure aluminum raw material, for example, there can be listed up Al—Cu, Al—Mg, Al—Mg—Si, Al—Zn—Mg, Al—Mn and Al—Si. Each of a housing 3 and a stem 4 mentioned later is preferably made of a steel material which is represented by stainless steel or S45C, and they may be made of the same kind of metal or may be made of different kinds of metals.

The mold 10 according to the present embodiment is provided with a tread mold section 11 which forms a tread section of a tire, side mold sections 12 and 13 which form side wall sections of the tire, and bead rings 14 to which bead sections of the tire is fitted. Although an illustration is omitted, an inner surface of the tread mold section 11 is provided with a protruding bone section for forming a groove on the tread surface of the tire. In FIG. 1, there are described one exhaust hole 16 which is open to an inner surface of the tread mold section 11, and one exhaust hole 16 which is open to an inner surface of the side mold section 13. However, there are actually provided a lot of exhaust holes 16 which are open to the inner surfaces of the tread mold section 11 and the side mold sections 12 and 13.

As shown in FIG. 2, the vent plug 2 is provided with the tubular housing 3 which has an exhaust passage 21 in an inner portion, the stem 4 which is inserted to the housing 3 and forms a valve body opening and closing the exhaust passage 21, and a spring 5 which serves as an urging-member for urging the stem 4 toward the cavity 15 so as to open the exhaust passage 21. The housing 3 is fitted into the exhaust hole 16 which is a circular hole, and is fixed to the molding surface 1. An opening portion 31 of the housing 3 has a top surface 31a which faces to the cavity 15. A through hole 32a and an inner collar-shaped support portion 32b are formed in a lower end portion 32 of the housing 3.

The stem 4 has a columnar body portion 41 which extends in an axial direction of the housing 3, and a head portion 42 which closes the exhaust passage 21 by coming into contact with the inner surface 31b of the opening portion 31 in the housing 3. The body portion 41 is inserted to the spring 5, and has lower end provided with a stopper 43 which has a larger diameter than that of the through hole 32a. The stopper 43 can pass through the through hole 32a by elastically deforming so as to close a slit 44. The head portion 42 is integrally connected to an upper end of the body portion 41. In the head portion 42, there are formed a top surface 42a which faces the cavity 15, and a side surface 42b which is opposite to the inner surface 31b of the opening portion 31.

The spring 5 is arranged so as to surround the body portion 41, and is interposed between the head portion 42 and the support-portion 32b so as to urge the stem 4. In the present embodiment, a coil-like spring is used as the urging member; however, the urging member is not limited to this, but can utilize, for example, a disc spring or a leaf spring.

The vent plug 2 shown in FIG. 2 is under a state in which the exhaust passage 21 is opened (hereinafter, refer to as "open state"). When the vent plug 2 is opened, the air within the cavity 15 is discharged to the external portion of the mold 10 via the exhaust passage 21 in connection with a motion that the outer surface of the tire moves close to the molding surface 1. When the outer surface of the tire depresses the stem 4, the head portion 42 comes into contact with the inner surface 31b of the opening portion 31 in the housing 3 and the exhaust passage 21 is closed as shown in FIG. 3. The vent plug 2 shown in FIG. 3 is under a state in which the exhaust passage 21 is closed (hereinafter, refer to as "closed state").

As shown in FIGS. 2 and 3, each of the top surface 31a of the opening portion 31 in the housing 3 and the top surface 42a of the head portion 42 in the stem 4 is formed by a flat surface. Furthermore, the top surface 31a of the opening portion 31 in the housing 3 and the top surface 42a of the head portion 42 in the stem 4 in a state in which the exhaust passage 21 is closed are both arranged closer to an opposite side to the cavity (a lower side in FIGS. 2 and 3) than the molding surface 1. As a result, an uncured rubber flowing from a side direction tends to come into contact with the head portion 42 from the cavity 15 side (an upper side in FIGS. 2 and 3) not from the side direction, and it is possible to suppress generation of the rubber biting by reducing the inflow rubber. Furthermore, since a projection formed on an outer surface of the tire is formed into an indistinctive shape, the projection contributes to securing of a quality of an outer appearance.

Furthermore, since the top surface 31a and the top surface 42a in the closed state are arranged, closer to the opposite side to the cavity than the molding surface 1, as mentioned above, there is room for depression of the stem 4 in a stage that the outer surface of the tire comes into contact with the molding surface 1. More specifically, since the outer surface of the tire coming into contact with the molding surface 1 is further depressed to the opposite side to the cavity, the stem 4 is completely depressed to be closed. Accordingly, an effect of discharging the air can be obtained longer than the conventional tire curing mold, and the remaining air can be reduced, thereby contributing to an improvement of the quality of the outer appearance of the tire.

A burying depth D of the housing 3 is measured as a distance from the molding surface 1 to the top surface 31a of the opening portion 31 in the housing 3 along a normal direction (a vertical direction in FIG. 3) of the molding surface 1. The burying depth D is set, for example, to 0.1 mm or more, however, is preferably set to 0.3 mm or more for enhancing the effect of suppressing the rubber biting. Furthermore, the burying depth D is preferably equal to or less than 1 mm for preventing the projection from giving a feeling of strangeness to the outer appearance of the tire. In order to suppress generation of a crack beginning at a root of the projection, the burying depth D is preferably set to 0.8 mm or less, and more preferably set to 0.6 mm or less.

In the present embodiment, the top surface 42a of the head portion 42 in the stem 4 in a state in which the exhaust passage 21 is closed is arranged flush with the top surface 31a of the opening portion 31 in the housing 3, as shown in FIG. 3. More specifically, the top surface 42a and the top surface 31a are arranged on the same flat surface in the closed state. Furthermore, the head portion 42 of the stem 4 and the opening portion 31 of the housing 3 form a tapered contact area in the closed state, and an outer edge 6 of the contact area is set on the top surface 31a of the opening portion 31. According to the structure mentioned above, since any step or streak is not formed on the top surface of the projection which is formed on the outer surface of the tire, it is possible to better secure the quality of the outer appearance of the tire.

In the present embodiment, the top surface 42a of the head portion 42 in the stem 4 in a state in which the exhaust passage 21 is opened is arranged closer to the opposite side to the cavity than the molding surface 1, as shown in FIG. 2. As a result, the uncured rubber flowing from the side direction is going to more securely come into contact with the head portion 42 of the stem 4 from the cavity 15 side without sideways coming into contact with the head portion 42, and it is possible to effectively suppress generation of the rubber biting. In the case that the top surface 42a in the open state is arranged flush with the molding surface 1, the same effect can be obtained, however, the arrangement closer to the opposite side to the cavity as mentioned above is more excellent in the effect of suppressing the rubber biting.

In the mold 10, since the top surface 31a of the opening portion 31 and the top surface 42a of the head portion 42 in the closed state are arranged closer to the opposite side to the cavity than the molding surface 1, the depression as described in FIG. 3 is formed on the molding surface 1. The projection is formed by the rubber filling the depression on the outer surface of the tire after being cured; however, since the projection is formed into a comparatively indistinctive shape, the quality of the outer appearance of the tire can be secured.

However, while influenced by the composition of the rubber, in the case that a stress is concentrated into the projection by repeat application of the deformation at the traveling time, a fine crack is generated beginning at the root of the projection, and there is a case that the quality of the outer appearance of the tire is deteriorated due to the fine crack. Particularly, since the projection formed on a surface which is not grounded in the tire such as a side wall surface does not disappear in connection with the travel, there is fear that a crack is generated. According to the circumstances mentioned above, it is desirable to be provided with a structure which can prevent the crack from being generated beginning at the root of the projection, in the tire curing mold according to the present invention.

Figure 4A:
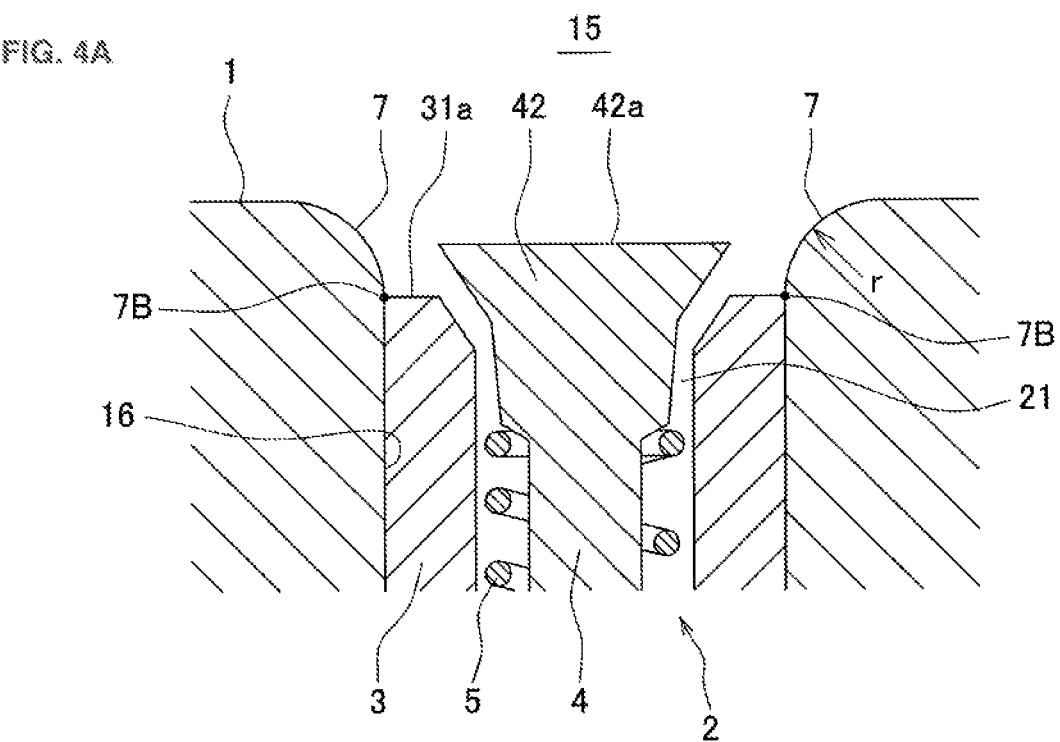
FIG. 4(a) is a cross sectional view showing a substantial part of a tire curing mold according to the other embodiment.
Figure 4B:
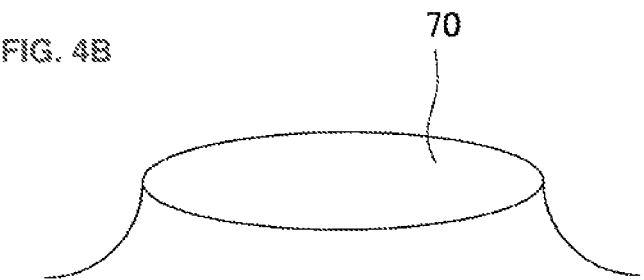
FIG. 4(b) is a perspective view of a projection which is formed on an outer surface of a tire.

FIG. 4(a) shows an example in which an edge portion connecting an inner peripheral surface of the exhaust hole 16 and the molding surface 1 is formed by a curved surface 7. The curved surface 7 is smoothly connected to both of the inner peripheral surface of the exhaust hole 16 and the molding surface 1. A radius r of curvature of the curved surface 7 is, for example, between 0.2 and 1.0 mm (R0.2 to R1.0). According to the structure mentioned above, since a projection 70 having such a shape that the root is curved as shown in FIG. 4(b) is formed on the outer surface of the tire, and the stress concentration onto the root of the projection 70 is reduced, it is possible to prevent the quality of the outer appearance of the tire from being deteriorated by preventing the generation of the crack.

In this case, the top surface 31a of the opening 31 in the housing 3 preferably coincides with a boundary 7B between the inner peripheral surface of the exhaust hole 16 and the curved surface 7 or is preferably arranged closer to an opposite side to the cavity than the boundary 7B, and the former is more desirable. As a result, since a side surface of the projection formed, on the outer surface of the tire is smooth and is formed into an indistinctive shape, this structure is useful for securing the quality of the outer appearance of the tire. FIG. 4(a) shows an example in which the top surface 31a coincides with the boundary 7B. The boundary 7B is also a boundary between a portion where a diameter of the exhaust hole 16 is not changed and a portion where the diameter is changed.

Figure 5A:
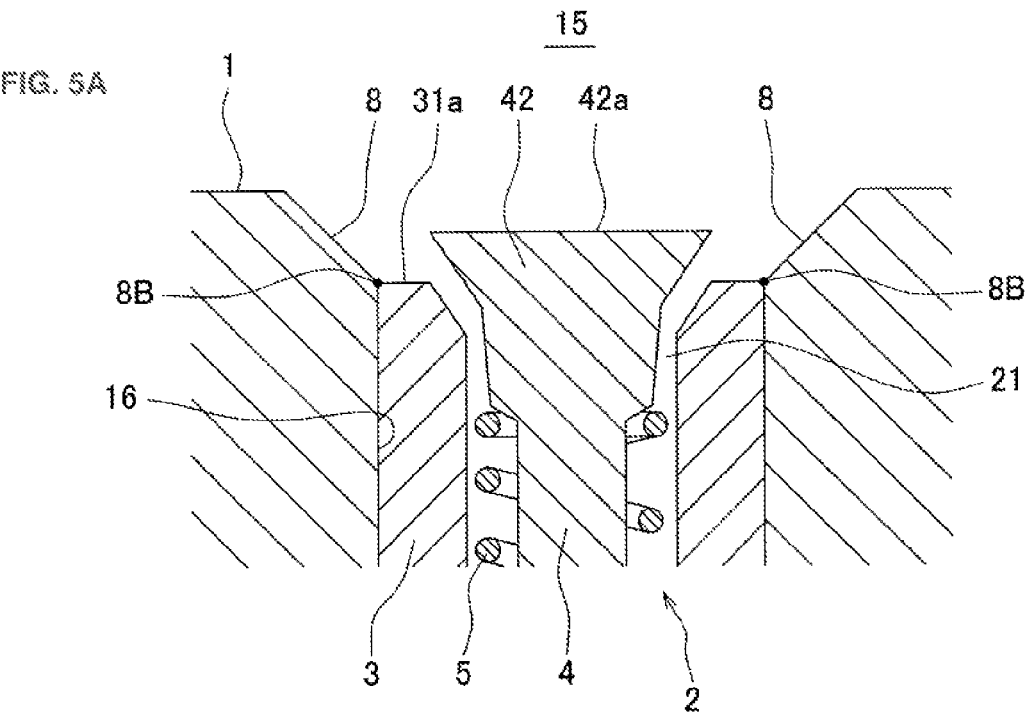
FIG. 5(a) is a cross sectional view showing a substantial part of a tire curing mold according to the other embodiment.
Figure 5B:
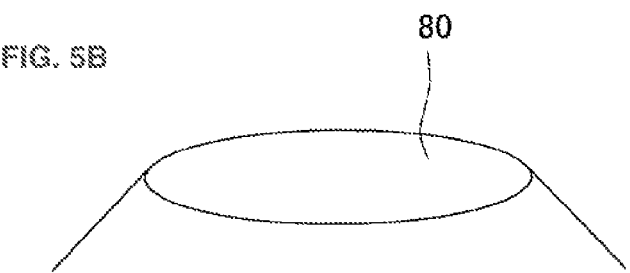
FIG. 5(b) is a perspective view of a projection which is formed on an outer surface of a tire.

FIG. 5(a) shows an example in which the edge portion connecting the inner peripheral surface of the exhaust hole 16 and the molding surface 1 is formed by an inclined surface 8. The inclined surface 8 is inclined to both of the inner peripheral surface of the exhaust hole 16 and the molding surface 1. The inclined surface 8 is formed, for example, to have a size corresponding to a C chamfer between C0.2 and C1.0. According to the structure mentioned above, since a projection 80 having such a shape that the root is inclined as shown in FIG. 5(b) is formed on the outer surface of the tire, and the stress concentration onto the root of the projection 80 is reduced, it is possible to prevent the quality of the outer appearance of the tire from being deteriorated by preventing the generation of the crack.

In this case, the top surface 31a of the opening portion 31 in the housing 3 preferably coincides with a boundary 8B between the inner peripheral, surface of the exhaust hole 16 and the inclined surface 8 or is preferably arranged closer to an opposite side to the cavity than the boundary 8B, and the former is more desirable. As a result, since a side surface of the projection formed on the outer surface of the tire is smooth and is formed into an indistinctive shape, this structure is useful for securing the quality of the outer appearance of the tire. FIG. 5(a) shows an example in which the top surface 31a coincides with the boundary 8B. The boundary 8B is also a boundary between a portion where a diameter of the exhaust hole 16 is not changed and a portion where the diameter is changed.

A manufacturing method of the tire using the metal mold 10 includes a step of setting an uncured tire to the cavity 15 of the metal mold 10 and curing while heating and pressurizing the uncured tire. The tire is expansion-deformed by inflation of a rubber bag which is called as bladder, and an outer surface of the tire is pressed against the molding surface 1. The air between the tire and the molding surface 1 is discharged to the external portion through the exhaust passage 21 of the vent plug 2 in the process. At this time, an exhaust performance may be enhanced by sucking a space within the exhaust hole 16 with a suction machine.

The tire curing mold mentioned above is the same as the normal tire curing mold except the above structure in the peripheral structure of the vent plug, and the conventionally known shapes, materials and mechanisms can foe employed in the present invention.

The present invention is not limited to the embodiment mentioned above, but can be variously modified and changed within the range which does not deflect from the scope of the present invention. The embodiment mentioned above provides the mold structure which is provided with the tread mold section and a pair of side mold sections; however, the present invention is not limited to this, but can be employed, for example, in a mold structure which is separated vertically into two sections in a center portion of the tread mold section.

EXAMPLES

In order to specifically indicate the structure and the effect of the present invention, a condition that a bare, a crack and a surface irregularity are generated was checked by executing the cure of the tire.

Generating Condition of Bars

The evaluation was made on the basis of a subjective evaluation with a plurality of panelists by setting a case that a rubber fracture called as bare is recognized on the outer surface of the tire after the cure and the quality of the outer appearance is out of an allowable level to "×", setting a case that some bare is recognized and the quality of the outer appearance is within the allowable level to "Δ", and setting a case that any bare is not recognized and the quality of the outer appearance has no problem to "○". In the case that the vent plug generates an operation defect due to the rubber biting, the bare is formed by the remaining air. Therefore, the generating condition of the bare may be an index of the effect of suppressing the rubber biting.

Generating Condition of Crack

A bench test in which the tire is caused to travel on a drum for 30000 km was carried out under an ozone concentration of 0.03 ppm by applying a standard load and a standard pneumatic pressure to the tire after being cured. In the tire after the test, the evaluation was made by setting a case that a fine crack is generated in the root of the projection formed on the outer surface of the tire to "×", setting a case that a crimple generation showing a sign of the fine crack is recognized to "Δ", and setting a case that any fine crack or crimple is not recognized to "○".

Condition of Surface Irregularity

The evaluation was made on the basis of a subjective evaluation, with ten panelists by setting a case, that a clear feeling of strangeness exists in the irregularities (the irregularities caused by the projection) on the outer surface of the tire after being cured to "×", setting a case that a feeling of strangeness exists if being pointed out to "Δ", and setting a case that the irregularities are not strange to "○".

The structures of the examples were in common except the specification shown in Table 1, and all the examples employed a spring vent in which the top surface of the head portion in the stem in the closed state is arranged flush with the top surface of the opening portion in the housing as shown in FIG. 2. Furthermore, the working examples 1 to 4 were structured such that the top surface of the head portion in the stem in the open state is arranged closer to the opposite side to the cavity than the molding surface. Results of evaluation are shown in Table 1.

TABLE 1

|  | Comparative Example 1 | Comparative Example 2 | Working Example 1 | Working Example 2 | Working Example 3 | Working Example 4 |
| --- | --- | --- | --- | --- | --- | --- |
| Burying depth | −0.3 mm (Protrude to cavity side) | 0 mm | 0.8 mm | 0.8 mm | 1.3 mm | 0.5 mm |
| Shape of edge portion | FIG. 3 | FIG. 3 | FIG. 3 | FIG. 4 (R0.3) | FIG. 4 (R0.5) | FIG. 5 (C0.5) |
| Bare | Δ | Δ | ○ | ○ | ○ | ○ |
| Crack | ○ | ○ | × | ○ | Δ | ○ |
| Surface irregularity | ○ | ○ | ○ | ○ | Δ | ○ |

As shown in Table 1, the generation of bare is reduced in the working examples 1 to 4 in comparison with the comparative examples 1 and 2, and the generation of the rubber biting can be evaluated to be suppressed. Furthermore, a fine crack was recognized in the root of the projection in the working example 1; however, the condition is improved in the working examples 2 to 4 which are devised in the shape of the edge portion.

What is claimed is:

1. A tire curing mold comprising:
a molding surface that comes into contact with an outer surface of a tire set to a cavity;
an exhaust hole, wherein the exhaust hole is provided in the molding surface and allows communication between an inner portion of the cavity and an external portion of the tire curing mold;
a vent plug, wherein the vent plug is installed within the exhaust hole open to the molding surface,
wherein the vent plug comprises a tubular housing, a stem and an urging member;
wherein an inner portion of the tubular housing forms an exhaust passage;
wherein the tubular housing has an opening portion and a lower end portion; and the opening portion of the tubular housing is closer to the cavity than the lower end portion;

wherein the stem is inserted into the tubular housing and forms a valve body that is capable of opening and closing the exhaust passage;

wherein the stem has a columnar body portion that extends in an axial direction of the tubular housing and a head portion that is capable of closing the exhaust passage by coming into contact with an inner surface of the opening portion of the tubular housing, wherein the urging member is capable of urging the stem towards the cavity so as to open the exhaust passage;

wherein a top surface of the opening portion of the tubular housing is a flat surface and a top surface of the head portion of the stem is a flat surface, wherein, when the exhaust passage is closed, the top surface of the opening portion in the tubular housing and the top surface of the head portion in the stem are both recessed from the molding surface, and wherein an edge portion connecting an inner peripheral surface of the exhaust hole and the molding surface is formed by a curved surface.

2. The tire curing mold according to claim 1, wherein, when the exhaust passage is closed, the top surface of the head portion of the stem is arranged flush with the top surface of the opening portion of the tubular housing.

3. The tire curing mold according to claim 1, wherein, when the exhaust passage is open, the top surface of the head portion of the stem in a state in which the exhaust passage is opened is arranged flush with the molding surface.

4. The tire curing mold according to claim 1, wherein the top surface of the opening portion in the tubular housing coincides with a boundary between the inner peripheral surface of the exhaust hole and the curved surface.

5. A manufacturing method of a tire comprising a step of setting an uncured tire to the cavity of the tire curing mold according to claim 1 and curing while heating and pressurizing the uncured tire.

6. The tire curing mold according to claim 1, wherein the vent plug is a spring vent.

7. The tire curing mold according to claim 1, wherein the tubular housing and the stem are a steel material.

8. The tire curing mold according to claim 1, wherein the molding surface is an aluminum material.

9. The tire curing mold according to claim 1, wherein the urging member is a spring.

10. The tire curing mold according to claim 1,
wherein the stem further comprises a stopper portion, which is at the opposite end of the stem from the head portion of the stem;
wherein the tubular housing has a through hole portion formed at the lower end portion of the tubular housing; and
wherein the stopper portion of the stem has a larger diameter than that of the through hole portion of the tubular housing.

11. The tire curing mold according to claim 10, wherein the urging member surrounds the columnar body portion of the stem and is interposed between the head portion of the stem and the stopper portion of the stem.

12. The tire curing mold according to claim 1, wherein the exhaust passage is closed by a side surface portion of the head portion of the stem coming into direct contact with the inner surface of the opening portion of the tubular housing; and
wherein the side surface portion of the head portion of the stem faces the inner surface of the opening portion of the tubular housing.

13. The tire curing mold according to claim 1, wherein, when the exhaust passage is open, the top surface of the head portion of the stem in a state in which the exhaust passage is opened is arranged recessed from the molding surface.

14. A tire curing mold comprising:
a molding surface that comes into contact with an outer surface of a tire set to a cavity;
an exhaust hole, wherein the exhaust hole is provided in the molding surface and allows communication between an inner portion of the cavity and an external portion of the tire curing mold;
a vent plug, wherein the vent plug is installed within the exhaust hole open to the molding surface,
wherein the vent plug comprises a tubular housing, a stem and an urging member;
wherein an inner portion of the tubular housing forms an exhaust passage;
wherein the tubular housing has an opening portion and a lower end portion; and the opening portion of the tubular housing is closer to the cavity than the lower end portion;
wherein the stem is inserted into the tubular housing and forms a valve body that is capable of opening and closing the exhaust passage;
wherein the stem has a columnar body portion that extends in an axial direction of the tubular housing and a head portion that is capable of closing the exhaust passage by coming into contact with an inner surface of the opening portion of the tubular housing,
wherein the urging member is capable of urging the stem towards the cavity so as to open the exhaust passage;
wherein a top surface of the opening portion of the tubular housing is a flat surface and a top surface of the head portion of the stem is a flat surface,
wherein, when the exhaust passage is closed, the top surface of the opening portion in the tubular housing and the top surface of the head portion in the stem are both recessed from the molding surface, and
wherein an edge portion connecting an inner peripheral surface of the exhaust hole and the molding surface is formed by an inclined surface.

15. The tire curing mold according to claim 14, wherein the top surface of the opening portion in the tubular housing coincides with a boundary between the inner peripheral surface of the exhaust hole and the inclined surface.

* * * * *